(12) United States Patent
Foss et al.

(10) Patent No.: US 10,150,178 B2
(45) Date of Patent: Dec. 11, 2018

(54) METHOD AND APPARATUS FOR VIBRATION WELDING

(71) Applicant: GM GLOBAL TECHNOLOGY OPERATIONS LLC, Detroit, MI (US)

(72) Inventors: Peter H. Foss, Oxford, MI (US); Yongqiang Li, Sunnyvale, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 15/344,748

(22) Filed: Nov. 7, 2016

(65) Prior Publication Data

US 2018/0126483 A1 May 10, 2018

(51) Int. Cl.
  *B32B 37/00* (2006.01)
  *B23K 20/10* (2006.01)
  *B23K 20/16* (2006.01)

(52) U.S. Cl.
  CPC .............. *B23K 20/10* (2013.01); *B23K 20/16* (2013.01)

(58) Field of Classification Search
  USPC ........................................................ 156/73.1
  See application file for complete search history.

(56) References Cited

U.S. PATENT DOCUMENTS

| 8,511,536 B2* | 8/2013 | Luechinger | H01L 24/78 228/160 |
| 2008/0023529 A1* | 1/2008 | Reatherford | B23K 20/10 228/110.1 |
| 2015/0068660 A1 | 3/2015 | Wang et al. | |
| 2015/0360414 A1 | 12/2015 | Li et al. | |

\* cited by examiner

*Primary Examiner* — James D Sells
(74) *Attorney, Agent, or Firm* — Quinn IP Law

(57) ABSTRACT

A method and associated device for joining a first workpiece to a second workpiece employing a vibration welder includes placing the first and second workpieces in a lapped arrangement and interposing an adhesive material between contiguous surfaces of the first and second workpieces. A first compressive load is applied to a spot welding locus associated with the lapped arrangement of the first and second workpieces, and then relaxed. A second compressive load is applied to the lapped arrangement of the first and second workpieces simultaneous with applying, via a vibration welder, a vibrational excitation to the spot welding locus associated with the lapped arrangement of the first and second workpieces. The applied vibrational excitation is discontinued, and the second compressive load continues to be applied to the spot welding locus associated with the lapped arrangement of the first and second workpieces for a period of time subsequent thereto.

20 Claims, 3 Drawing Sheets

METHOD AND APPARATUS FOR VIBRATION WELDING

INTRODUCTION

Vibration welding is an industrial technique whereby a vibration welding device or welder locally applies high-frequency acoustic vibrations to workpieces that are held together under pressure to create a weld. It is particularly suited for welding thermoplastic workpieces. A vibration welding process includes placing contiguous or overlapped workpieces on a nest or anvil and employing a vibration welder to direct high frequency vibration to an interface between the workpieces. A vibration welder preferably includes a converter or piezoelectric transducer, a booster and a sonotrode, also referred to as a horn. These elements are preferably tuned to resonate at the same ultrasonic frequency, which may be, by way of example, 20, 30, 35 or 40 kHz. The converter converts an electrical signal into a mechanical vibration, the booster modifies the amplitude of the vibration, and the sonotrode clamps the workpieces and applies mechanical vibration thereto to join the workpieces. An electronic vibration generator delivers a high power AC signal with frequency matching the resonance frequency, and is preferably controlled by a controller controlling movement of the welder and delivering the vibration energy. The vibration generates heat that locally melts materials of the workpieces to form a weld joint.

SUMMARY

A method and associated device for joining a first workpiece to a second workpiece employing a vibration welder is described, and includes placing the first and second workpieces in a lapped arrangement and interposing an adhesive material between contiguous surfaces of the first and second workpieces. A first compressive load is applied to a spot welding locus associated with the lapped arrangement of the first and second workpieces, and then relaxed. A second compressive load is applied to the lapped arrangement of the first and second workpieces simultaneous with applying, via a vibration welder, a vibrational excitation to the spot welding locus associated with the lapped arrangement of the first and second workpieces. The applied vibrational excitation is discontinued, and the second compressive load continues to be applied to the spot welding locus associated with the lapped arrangement of the first and second workpieces for a period of time subsequent thereto.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 3-1, 3-2 and 3-3 schematically show sequential arrangements of one embodiment of the welding tool described with reference to FIG. 1 to execute the vibration welding process, in accordance with the disclosure;

FIGS. 4-1, 4-2, 4-3 and 4-4 schematically show sequential arrangements of another embodiment of the welding tool described with reference to FIG. 1 to execute the vibration welding process, in accordance with the disclosure; and FIGS. 5-1, 5-2 and 5-3 schematically show sequential arrangements of another embodiment of the welding tool described with reference to FIG. 1 to execute the vibration welding process, in accordance with the disclosure.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms may be used with reference to the drawings. Directional terms are not to be construed to limit the scope of the disclosure in any manner. Furthermore, the disclosure, as illustrated and described herein, may be practiced in the absence of any element which is not specifically disclosed herein.

Figure 1:
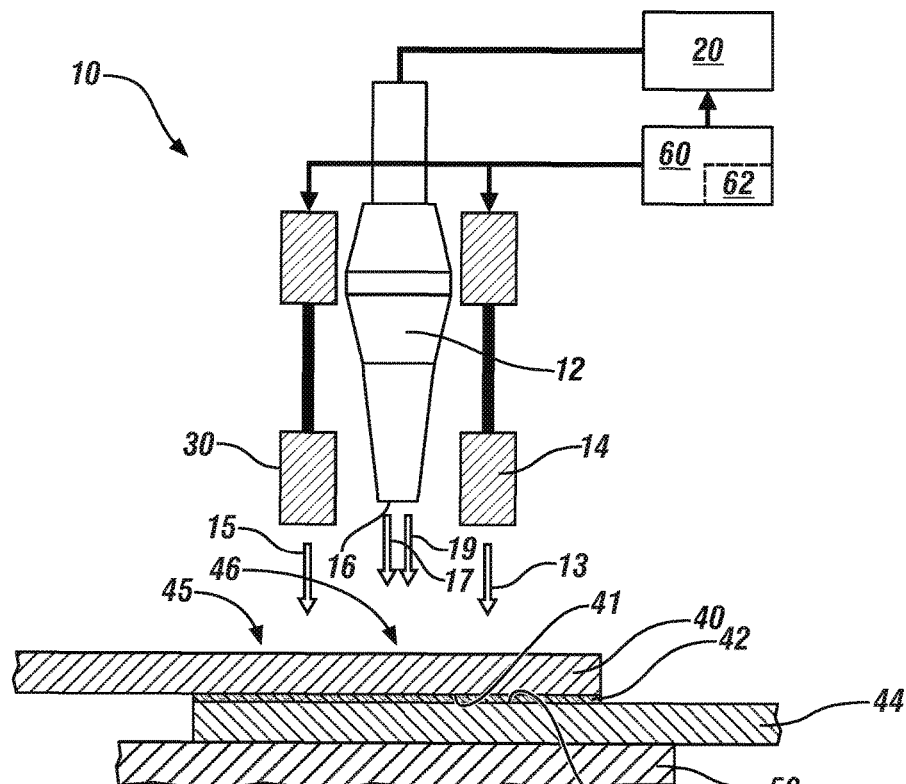
FIG. 1 schematically illustrates a partial cross-sectional side view of an embodiment of a welding tool that is disposed to execute a novel welding process to form a lap joint between a first workpiece and a second workpiece, in accordance with the disclosure.

Referring now to the drawings, wherein the depictions are for the purpose of illustrating certain exemplary embodiments only and not for the purpose of limiting the same, FIG. 1 schematically illustrates a partial cross-sectional side view of one embodiment of a welding tool 10 and welding controller 60 that are disposed to execute a novel welding process 62 to form a lap joint 46 between a first workpiece 40 and a second workpiece 44. A spot welding locus 45 is indicated, and represents a specific location on the lapped portion of the first and second workpieces 40, 44 at which the welding tool 10 executes vibration welding to form a spot weld. The first and second workpieces 40, 44 may be fabricated from polymer composite materials, for example thermoplastic materials including without limitation, nylon, polypropylene, polyethylene, polystyrene, and polyester, which may be reinforced with glass or carbon fibers. In addition, the first and second workpieces 40, 44 may be fabricated from metallic substances.

The first and second workpieces 40, 44 are joined by a combination of a vibration spot weld in conjunction with an adhesive material 42. The lap joint 46 may be secured by at least one vibration spot weld that can be executed by the welding tool 10 at the spot welding locus 45 and by the adhesive material 42, which is interposed between contiguous first and second joining surfaces 41, 43, respectively, of the respective first and second workpieces 40, 44. The first and second workpieces 40, 44 are joined by placing the first and second workpieces 40, 44 in a lapped arrangement, interposing the adhesive material 42 between contiguous surfaces thereof, and employing the welding tool 10 to execute the novel welding process 62 at the spot welding locus 45 to form a vibration spot weld.

The welding tool 10 includes a vibration welder 12, a clamping device 14, a compressive load actuator 30 and an anvil 50 that may be constructed in accordance with the disclosure. The vibration welder 12 includes, in one embodiment, an ultrasonic transducer, a booster, and a sonotrode having a welding tip 16, and is connected to an electronic ultrasonic generator 20, which controls operation thereof. A sonotrode is a device that is capable of converting electrical power to ultrasonic vibrations.

Welding energy is transferred from the electronic ultrasonic generator 20 to the welding tip 16 during vibration welding. The vibration welding process includes the vibration welder 12 generating oscillatory motion having an amplitude that is in the order of several micrometers to over one hundred micrometers. The oscillatory motion is transferred via the welding tip 16 to the first and second workpieces 40, 44 at the spot welding locus 45 in a direction that is normal to their surfaces. In one embodiment, the vibration welder 12 attaches to an end-effector of a robotic arm, which guides placement of the vibration welder 12 and activates the electronic ultrasonic generator 20 to effect vibration welding of the first and second workpieces 40, 44 when they are placed on the anvil 50. Alternatively, the vibration welder 12 may be employed as part of a fixed tooling setup, such as in a hard automatic tooling configuration, on a bench top configuration, or in a pedestal welder configuration. Furthermore, any tooling configuration may be composed of a single vibration welder 12 or, alternatively, multiple vibration welders 12 acting in concert.

The clamp device 14 may be any suitable device or combination of devices that are configured to exert a clamping force 13 to securely hold the first and second workpieces 40, 44 in place on the anvil 50 during execution of the vibration welding process 62. The clamp device 14 is preferably configured to supply the clamping force 13 to urge the first and second workpieces 40, 44 against the anvil 50, wherein the clamping force 13 is decoupled from other forces that may be exerted against the first and second workpieces 40, 44 during execution of the vibration welding process 62.

The welding controller 60 may be any device capable of executing machine readable instructions. The term controller, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

Figure 2:
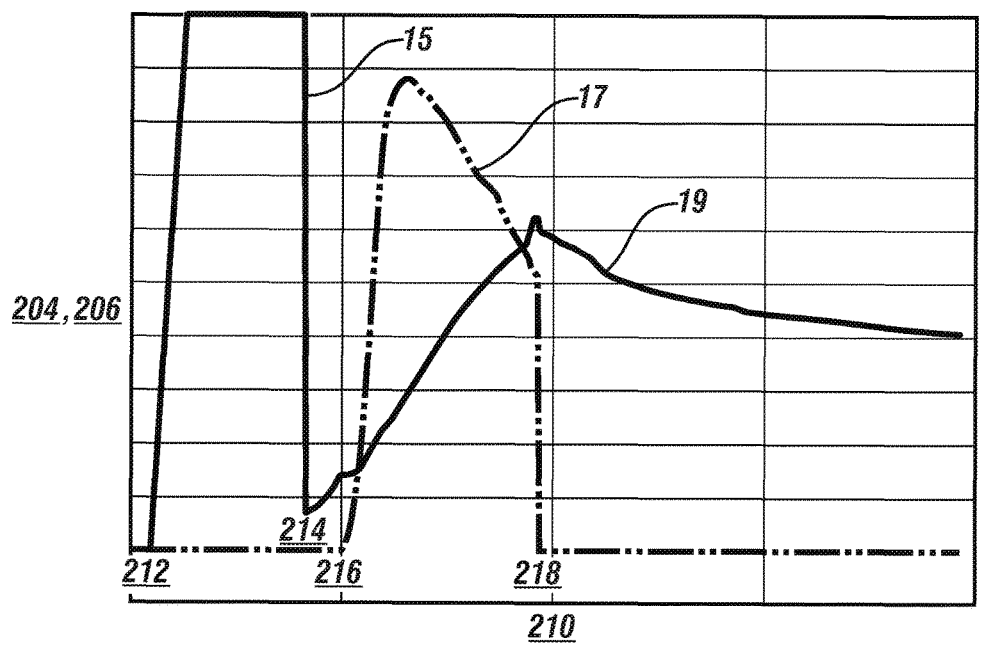
FIG. 2 graphically shows a time-based operation of the welding tool described with reference to FIG. 1 during execution of the vibration welding process, in accordance with the disclosure.

FIG. 2 graphically shows a time-based operation of one embodiment of the welding tool 10 described with reference to FIG. 1 during execution of an embodiment of the vibration welding process 62. Time 210 is indicated on the horizontal axis, and compressive force 204 and ultrasonic power 206 are indicated on the vertical axis. Prior to initiating the vibration welding process 62, the first and second workpieces 40, 44 are placed in a lapped arrangement, with the adhesive material 42 interposed between contiguous surfaces thereof and clamped in place by the clamp device 14.

Initially, starting at time point 212, a first compressive load 15 is applied by the compressive load actuator 30 to compress a portion of the lapped arrangement of the first and second workpieces 40, 44 against the anvil 50, preferably at the spot welding locus 45. The magnitude and elapsed time for the first compressive load 15 is selected to urge the adhesive material 42 away from the spot welding locus 45 prior to executing vibration welding to form a spot weld at the spot welding locus 45. After a suitable period of time, the first compressive load 15 is relaxed, as indicated at timepoint 214. After relaxation of the first compressive load 15, the welding tool 10 begins applying a second compressive load 19 to the spot welding locus 45, as indicated at timepoint 214. Simultaneously, the vibration welder 12 is controlled to transfer welding energy 17 that is generated by the electronic ultrasonic generator 20 to the welding tip 16, which is applied to the first workpiece 40 at the spot welding locus 45. This is indicated as beginning at timepoint 216. The vibration welder 12 transfers the welding energy 17 for a predetermined period of time, and then stops, which is indicated at timepoint 218. The second compressive load 19 may be applied in a ramped manner to the spot welding locus 45 such that the second compressive load 19 increases in magnitude over a predetermined period of time. The second compressive load 19 preferably reaches a maximum magnitude when the vibration welder 12 stops transferring the welding energy 17, as indicated at timepoint 218. The second compressive load 19 is maintained at some level of compressive loading for a subsequent period of time, albeit steadily relaxing, as shown. The magnitudes of the first and second compressive loads 15, 19 and the periods of time are application-specific.

Figures 1, 3:
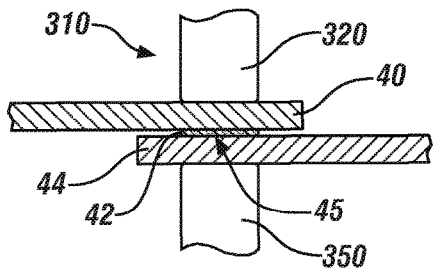
Figures 2, 3:
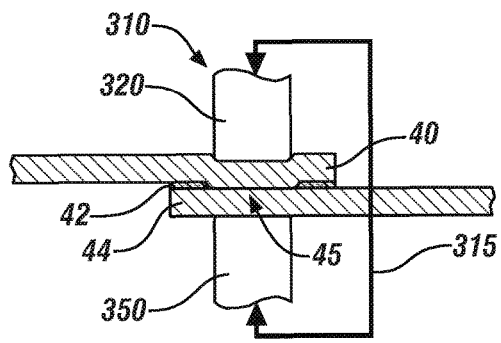
Figure 3:
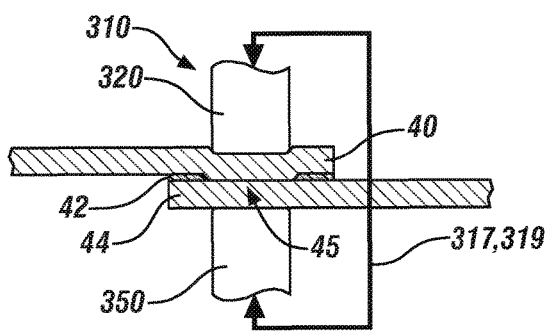

FIGS. 3-1, 3-2 and 3-3 schematically show sequential arrangements of the vibration welding process 62 as executed by one embodiment of the welding tool 10 that is described with reference to FIG. 1 and is indicated by element 310. The welding tool 310 includes vibration welder 320 and anvil 350 that are arranged to execute the vibration welding process 62 on the first and second workpieces 40, 44 that are placed in a lapped arrangement with the adhesive material 42 interposed between contiguous surfaces thereof. FIG. 3-1 schematically shows the lapped arrangement of first and second workpieces 40, 44 with the adhesive material 42 interposed therebetween, and secured between the vibration welder 320 and the anvil 350. The spot welding locus 45 is also indicated. FIG. 3-2 schematically shows application of the first compressive load 315 on the lapped arrangement of first and second workpieces 40, 44 at the spot welding locus 45. In this embodiment, the first compressive load 315 is applied at the spot welding locus 45 by the vibration welder 320, preferably via its welding tip, and then relaxed. FIG. 3-3 schematically shows application of the welding energy 317 and the second compressive load 319 on the lapped arrangement of first and second workpieces 40, 44 at the spot welding locus 45. In this embodiment, the welding energy 317 and the second compressive load 319 are applied by the vibration welder 320 at the spot welding locus 45.

Figures 1, 4:
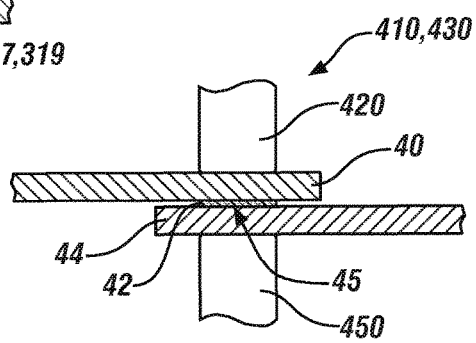
Figures 2, 4:
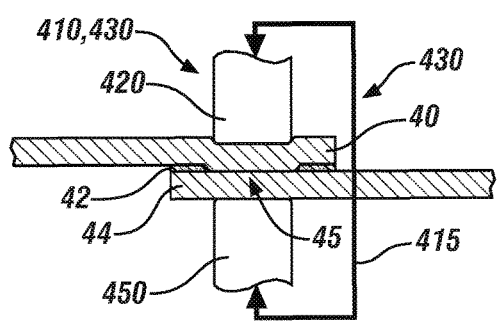
Figure 4:
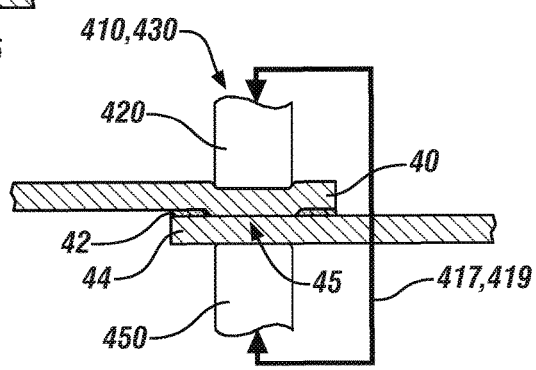
Figures 3, 4:
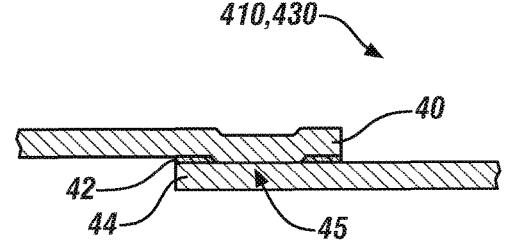

FIGS. 4-1, 4-2, 4-3 and 4-4 schematically show sequential arrangements of the vibration welding process 62 as executed by another embodiment of the welding tool 10 that is described with reference to FIG. 1 and is indicated by element 410. The welding tool 410 includes a vibration welder 420, a compressive load actuator 430 and anvil 450. In this embodiment the compressive load actuator 430 is a device that is mechanically and controllably separated from the vibration welder 420. The welding tool 410 is arranged to execute the vibration welding process 62 on the first and second workpieces 40, 44 that are placed in a lapped arrangement with the adhesive material 42 interposed between contiguous surfaces thereof. FIG. 4-1 schematically shows the lapped arrangement of first and second workpieces 40, 44 with the adhesive material 42 interposed therebetween, and secured between the compressive load actuator 430 and the anvil 450. The spot welding locus 45 is also indicated. FIG. 4-2 schematically shows application of the first compressive load 415 on the lapped arrangement of first and second workpieces 40, 44 at the spot welding locus 45. In this embodiment, the first compressive load 415 is applied by the compressive load actuator 430, and then relaxed. FIG. 4-3 schematically shows the lapped arrangement of first and second workpieces 40, 44 at the spot welding locus 45 after the first compressive load 415 has been applied by the compressive load actuator 430 and removed. FIG. 4-4 schematically shows application of the welding energy 417 and the second compressive load 419 on the lapped arrangement of first and second workpieces 40, 44 at the spot welding locus 45. In this embodiment, the welding energy 417 and the second compressive load 419 are applied by the vibration welder 420 at the spot welding locus 45.

Figures 1, 5:
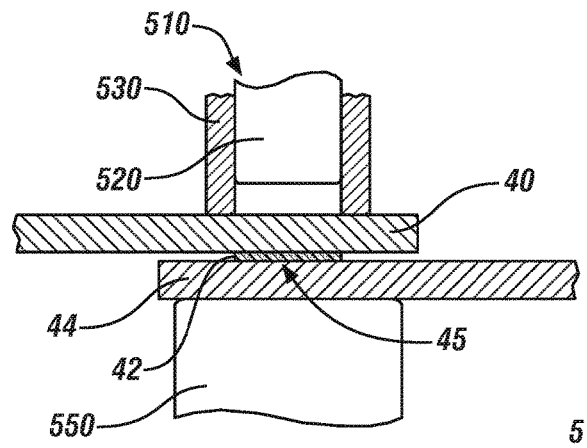
Figures 2, 5:
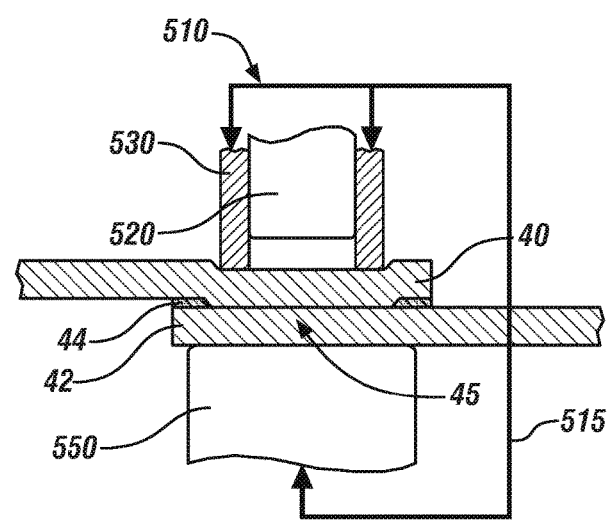
Figures 3, 5:
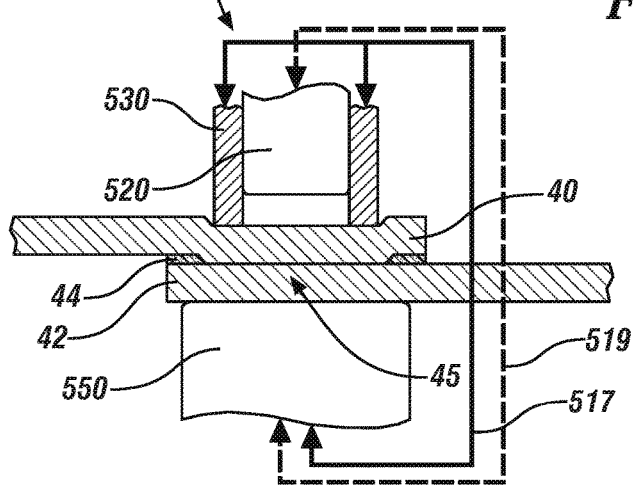

FIGS. 5-1, 5-2 and 5-3 schematically show sequential arrangements of the vibration welding process 62 as executed by one embodiment of the welding tool 10 that is described with reference to FIG. 1 and is indicated by element 510. The welding tool 510 includes a compressive load actuator 530 that is integrated with the vibration welder 520 and anvil 550 that are arranged to execute the vibration welding process 62 on the first and second workpieces 40, 44 that are placed in a lapped arrangement with the adhesive material 42 interposed between contiguous surfaces thereof. FIG. 5-1 schematically shows the lapped arrangement of the first and second workpieces 40, 44 with the adhesive material 42 interposed therebetween, and secured between the compressive load actuator 530 and the anvil 550. The spot welding locus 45 is also indicated. FIG. 5-2 schematically shows application of the first compressive load 515 on the lapped arrangement of first and second workpieces 40, 44 at the spot welding locus 45. In this embodiment, the first compressive load 515 is applied by the compressive load actuator 530, and then relaxed. FIG. 5-3 schematically shows application of the welding energy 517 and the second compressive load 519 on the lapped arrangement of first and second workpieces 40, 44 at the spot welding locus 45. In this embodiment, the welding energy 517 is applied by the vibration welder 520 at the spot welding locus 45, and the second compressive load 519 is applied by the compressive load actuator 530.

The vibration welding process 62 described herein facilitates development of a lapped junction between polymeric workpieces that includes use of an adhesive in combination with one or more spot welds. The adhesive can be applied to either or both of the first and second joining surfaces 41, 43, respectively, of the respective first and second workpieces 40, 44 prior to vibration welding. The vibration welding process 62 uses compressive forces to urge the applied adhesive away from the spot welding locus 45 prior to executing vibration welding to form a spot weld at the spot welding locus 45. The continuous adhesive bond serves to improve joint performance, increase structural stiffness, seal the joint line and reduce noise and vibration. The adhesive bond reinforces the spot weld, thus reducing stress thereon. Furthermore, the spot weld(s) sets the orientation geometry of the first workpiece 40 in relation to the second workpiece 44, eliminating the need for additional fixturing during adhesive cure. The resulting work product that includes the first and second workpieces 40, 44 can be conveyed through the rest of the body assembly process while the adhesive undergoes curing.

Overall, the vibration welder 12 described herein includes an integrated clamp mechanism that provides clamping forces that may be separated from the forces exerted by the welding horn on the workpiece. This allows the ultrasonic welding horn to concentrate ultrasonic energy within a weld zone, and increases the efficiency of vibration welding. Such action reduces power needs and required size of the welder and its associated generator. This also overcomes inertia and avoids diverting clamping energy in order to minimize vibrating of a workpiece in resonance with the horn. Integrating the clamping mechanism with the welder simplifies tooling and fixturing, and permits integrated cooling to the horn and the workpieces. In the consolidation or holding stage after ultrasonic vibration is complete, the horn retracts away from the contact surface of the workpieces while the clamp continues to exert clamping force on the workpieces, thus allowing the workpieces to consolidate. Such early retraction of the horn reduces or eliminates occurrence of heat transfer between the horn and the workpieces and facilitates thermal management of the horn. As such, vibration welding quality is improved, and manufacturing tooling complexity welder power can be reduced.

The vibration welding process 62 can be executed as a control routine that may be implemented as a system that includes computer programs in the form of a module, segment, or portion of code, which include one or more executable instructions for implementing the specified logical function(s), or may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for joining a first workpiece to a second workpiece, the method comprising:
   placing the first and second workpieces in a lapped arrangement and interposing an adhesive material between contiguous surfaces of the first and second workpieces;
   applying a first compressive load to a spot welding locus associated with the lapped arrangement of the first and second workpieces;
   relaxing the first compressive load;
   applying a second compressive load and applying, via a vibration welder, a vibrational excitation to the spot welding locus associated with the lapped arrangement of the first and second workpieces; and
   discontinuing the applying of the vibrational excitation via the vibration welder and continuing the applying of the second compressive load to the spot welding locus associated with the lapped arrangement of the first and second workpieces for a period of time.

2. The method of claim 1, wherein the magnitude of the first compressive load is sufficient to urge adhesive material away from the spot welding locus associated with the lapped arrangement of the first and second workpieces.

3. The method of claim 1, wherein the first compressive load is applied via the vibration welder.

4. The method of claim 1, wherein the first compressive load is applied via a first compressive load actuator that is mechanically separated from the vibration welder.

5. The method of claim 1, wherein the second compressive load is applied via a compressive load actuator that is mechanically integrated with the vibration welder.

6. The method of claim 1, wherein the second compressive load is applied via the vibration welder.

7. The method of claim 1, wherein the second compressive load is applied via a compressive load actuator that is mechanically integrated with the vibration welder.

8. The method of claim 1, wherein the second compressive load is applied via a compressive load actuator that is mechanically separated from the vibration welder.

9. The method of claim 1, wherein the first and second workpieces are fabricated from thermoplastic materials.

10. The method of claim 1, wherein the second compressive load is applied simultaneously with the vibrational excitation.

11. The method of claim 1, wherein the second compressive load is applied to the spot welding locus in a ramped manner to increase magnitude over a period of time.

12. The method of claim 11, wherein the second compressive load reaches a maximum magnitude when the vibration welder discontinues the applying of the vibrational excitation via the vibration welder.

13. A device for joining first and second workpieces that are arranged in a lapped configuration, wherein an adhesive material is interposed between contiguous surfaces of the first and second workpieces, the device comprising:
   a vibration welder including a welding tip;
   a clamping device and an anvil disposed to clamp the first and second workpieces; and
   a compressive load actuator; and
   a controller operatively connected to the vibration welder, the clamping device and the compressive load actuator, the controller including an instruction set, the instruction set executable to:
      apply a first compressive load to a spot welding locus associated with the lapped arrangement of the first and second workpieces,
      relax the first compressive load,
      apply a second compressive load and apply, via a vibration welder, a vibrational excitation to the spot welding locus associated with the lapped arrangement of the first and second workpieces, and
      discontinue the applied vibrational excitation via the vibration welder and continue the applied second compressive load to the spot welding locus associated with the lapped arrangement of the first and second workpieces for a period of time.

14. The device of claim 13, wherein the magnitude of the first compressive load is sufficient to urge adhesive material away from the spot welding locus associated with the lapped arrangement of the first and second workpieces.

15. The device of claim 13, wherein the first compressive load is applied via the vibration welder.

16. The device of claim 13, wherein the first compressive load is applied via a first compressive load actuator that is mechanically separated from the vibration welder.

17. The device of claim 13, wherein the second compressive load is applied via a compressive load actuator that is mechanically integrated with the vibration welder.

18. The device of claim 13, wherein the second compressive load is applied via the vibration welder.

19. The device of claim 13, wherein the second compressive load is applied via a compressive load actuator that is mechanically integrated with the vibration welder.

20. The device of claim 13, wherein the second compressive load is applied via a compressive load actuator that is mechanically separated from the vibration welder.

* * * * *